United States Patent [19]

Pritchard et al.

[11] Patent Number: 5,232,957

[45] Date of Patent: Aug. 3, 1993

[54] RIM MOLDED ENERGY ABSORBING POLYURETHANE FOAM

[75] Inventors: James R. Pritchard, Somersworth; William Humphrey, Dover, both of N.H.

[73] Assignee: Davidson Textron Inc., Dover, N.H.

[21] Appl. No.: 943,873

[22] Filed: Sep. 11, 1992

[51] Int. Cl.$^5$ .............................................. C08G 18/00
[52] U.S. Cl. ..................................... 521/174; 521/176
[58] Field of Search ................................. 521/174, 176

[56] References Cited

U.S. PATENT DOCUMENTS

| | | | |
|---|---|---|---|
| 3,950,317 | 4/1976 | Patton, Jr. et al. | 260/88.3 |
| 3,953,393 | 4/1976 | Ramlow et al. | 260/31.8 |
| 4,568,705 | 2/1986 | Grace et al. | 521/137 |
| 4,689,354 | 8/1987 | Ramlow et al. | 521/137 |
| 4,690,956 | 9/1987 | Ramlow et al. | 521/137 |
| 4,866,102 | 9/1989 | Pray et al. | 521/137 |
| 4,950,694 | 8/1990 | Hager | 521/167 |
| 5,047,441 | 9/1991 | Lind et al. | 521/137 |
| 5,073,576 | 12/1991 | Kuyzin et al. | 521/99 |
| 5,143,941 | 9/1992 | Rossio et al. | 521/51 |
| 5,167,884 | 12/1992 | Rossio et al. | 264/45.5 |

*Primary Examiner*—Morton Foelak
*Attorney, Agent, or Firm*—Reising, Ethington, Barnard, Perry & Milton

[57] ABSTRACT

A RIM molded energy absorbing polyurethane rigid foam prepared from reacting inter alia a graft polymer polyol and an organic isocyanate using water as the blowing agent.

8 Claims, No Drawings

RIM MOLDED ENERGY ABSORBING POLYURETHANE FOAM

FIELD OF INVENTION

The present invention is directed to an energy absorbing rigid polyurethane foam and methods for the preparation of same.

BACKGROUND OF THE INVENTION

Pertinent art to the present invention is found in U.S. Pat. No. 4,866,102 and references cited therein. The '102 patent describes a rigid polyurethane foam formed from a polyoxyalkylene polyether polyol having therein a graft polymer dispersion, an alkylene oxide adduct of toluenediamine or methylenedianiline, a crosslinking agent, an organic polyisocyanate, water, catalysts, and an additional blowing agent.

SUMMARY OF THE INVENTION

The present invention provides a rigid foam having energy-absorbing properties and is comprised of a graft polymer polyol and an organic isocyanate. More particularly, the present invention provides a RIM (Reaction Injection Molded) energy absorbing polyurethane rigid foam comprising a graft polymer polyol, an organic isocyanate, crosslinking agents, and other components such as catalysts and surfactants. In practicing the present invention, water is used as the blowing agent.

More particularly, the present invention provides a RIM molded energy absorbing polyurethane rigid foam comprising the reaction product of a graft polymer polyol which is an ethylene oxide-propylene oxide adduct of propylene glycol containing ethylene oxide as a cap with a mixture of a styrene: acrylonitrile dispersion, a crosslinking agent, an organic isocyanate, catalysts, surfactants and water as the blowing agent. The present invention also provides a method for preparing the rigid foam.

DETAILED DESCRIPTION OF THE INVENTION

The present invention provides a unique rigid foam in that it comprises excess organic isocyanate as compared to rigid polyurethane foams known in the art. Furthermore, the rigid foam of the present invention is prepared using water as the sole blowing agent rather than aromatic fluorocarbons or combinations of fluorocarbons and water. This advance in the art comes at a time which is particularly timely given the current concerns with environmental pollution.

Certain aspects of the present invention are conventional, employing reactants known in the art as will be seen from the disclosure set forth below. The unique combination of the components employed in the present invention results in an improved rigid foam.

The prior art, in particular as represented by U.S. Pat. No. 4,866,102, teaches how to achieve a flat, square wave for energy management using chlorofluorocarbons (CFCs) as the blowing agent to achieve the proper cell structure and density. When the prior art teachings are modified by using water alone as the blowing agent, the force deflection curve has an increased slope which is not efficient in managing energy.

The present invention uses isocyanurate chemistry, along with graft polymer polyols, and allows us to use water as the sole blowing agent to give the desired energy management properties. The graft polymer polyol is used to regulate the size of the cells, as well as control the open cell content of the foam. The graft polyol also uses the water efficiently to blow the foam to low density. The chain extenders (or crosslinker) are used to control molecular weight per crosslink, and the result is the ability to control the uniform brittleness of the foam. The isocyanurate linkages also contribute to the desired brittleness in the foam that gives a constant force to crush the foam. Isocyanurate foams are inheritly flame resistant; and when combined with the polymer polyol, use of flame retardants in the present foam product is optional. Isocyanurate foams are also extremely stable with very little change in properties over time or environmental changes.

The polyols that find use in the invention are polyether/polyester polyols containing a polymer dispersion or "graft", and they may be employed along with other polyhydroxyl-containing components commonly used in the art. Polymer polyols are useful in making foams of higher hardness then can be obtained by using unmodified polyols alone. Filled polyols also aid foam processing by improving cell openness. The filler polymer is normally formed by in-situ polymerization of monomers in a polyol base, through either free radical or step addition processes. There are three main types of modified polyols: 1) Polyvinyl-modified polyethers or "polymer polyols", 2) Polyols containing polyurea dispersions (PHD polyols), 3) polyols containing polyurethane dispersions (PIPA polyols). The graft polyols are ethylene oxide-propylene oxide adducts of propylene glycol, containing ethylene oxide as a cap, and between 15 to 45 percents of styrene, acrylonitrile or a combination of both as a dispersion. Representative examples of such polyols include Pluracol 973 and Pluracol 994 (sold by BASF), Voranol 4925 (sold by Dow Chemical, USA), and UCC 3128 (sold by Union Carbide). PHD (poly harnstoff dispersion) polyols are dispersions of polyurea particles in conventional polyols. These polyols are prepared by the reaction of diamine (hydrazine) with a diisocyanate (toluene diisocyanate) in the presence of a polyether polyol. Representative examples of such polyols are PHD 9151 and PHD 9184, sold by Miles Chemical. PIPA polyols are similar to the PHD polyols, but contain, instead, dispersed particles of polyurethanes formed by the in-situ reaction of an isocyanate and an alkanolamine, e.g., triethanolamine. In general, the amine is blended into a conventional polyol with, for example, toluene diisocyante, under rapid stirring. PIPA polyols are typically made and used by foam producing companies that have acquired patent licenses.

Chain extending agents which may be employed in the preparation of the polyisocyanurate foam used in the present invention include aromatic or aliphatic nitrogen containing primary or secondary diamines, polyoxypropylene derivatives of sucrose based catalytic or non-catalytic polyols and sorbitol based polyols, all of which are well known in the art.

The most efficient method for the preparation of isocyanurate foam is by catalytic cyclization of the isocyanate. The catalysts employed are referred to as trimer catalysts and include various oxides, alkoxides, amines, carboxylates, hydrides, and hydroxides of quaternary nitrogen, phosphorus, arsenic, and antimony as shown in Table 1 set forth below. Other catalysts which may be used in preparing the foam of the present invention include acids, organometallics and combinations of such as shown in Table 2 set forth below.

The urethane catalysts which are useful in the present invention are those described at column 8, line 59, to column 9, line 2, of U.S. Pat. No. 4,866,102. Such urethane catalysts are well known in the art and are commercially available.

Surfactants which find use in the present invention are generally described in U.S. Pat. No. 4,866,102 at column 9, lines 3 to 16, and are well known in the art.

Column 8, lines 7 through 36, and column 9, lines 1 through 16, of U.S. Pat. No. 4,866,102 are incorporated herein by reference.

The organic polyisocyanates which may be employed in the present invention are those generally known in the art as described in U.S. Pat. No. 4,866,102 at column 8, lines 7 through 36.

In the following chemical formulation examples, the various components are the following:

PI-A means a polymeric isocyanate with a functionality of 2.2 and free isocyanate of about 31% such as MF-182 sold by ICI Americas or PAPI-94 sold by Dow Chemical Company.

PI-B means a polymeric isocyanate with a functionality of 3+ and free isocyanate of about 30.5% such as PAPI 580 sold by Dow Chemical Company.

Thanol R-575 is a chain extender sold by Eastman Chemical. Other chain extenders include Voranol 270-370 sold by Dow Chemical Co. and Pluracol 975 sold by BASF.

Each of K-15, X8136 and TMR-2 is a trimer catalyst sold by Air Products Corporation. Catalyst X-8136 is a preferred trimer catalyst due to the lack of the "fishy" odor associated with many catalysts. Each of DABCO 33-LV and Polycat 5 is a urethane catalyst sold by Air Products Corporation.

Each of DC-5244 and B-8863-T is a surfactant sold by Air Products Corporation and Goldschmitt Chemical, respectively.

Each of the chemical formulations set forth below were prepared either by common manual techniques (by hand) or on a HiTech Sure Shot 50 RIM machine using an Admiral 10/14L type mixhead. The machine was set as follows: impingement pressure was 2,000 pounds per square inch, isocyanate temperature was 80° F., polyol temperature was 95° F. The mold temperature was 140° F.–155° F. (150° F. preferred). The total throughput of the machine was 200–250 grams per second. The different formulations were injected directly into the center of the mold and closed after five seconds. The parts were demolded three to five minutes later. The parts were cured for three days before testing at room temperature.

The example set forth as chemical formulation number 20 represents a preferred embodiment of the present invention.

In the examples set forth below, the compression strength which is reported as kilopascals at 10%, 50% and 70% deflection is a measure of the pressure, which is applied at a constant rate, required to crush a block of the rigid foam that measures $10'' \times 10'' \times 2''$. In the examples, the chart speed was 1" per minute at a FSL (full scale load) of 10,000 lbs. The objective is to obtain a flat, square wave for energy management which is reflected by the 50/10 ratio. The 50/10 ratio is the compression strength of the foam at 50% deflection divided by the compression strength at 10% deflection. The ideal 50/10 ratio is a value of one; however, acceptable energy management performance can be obtained up to a 50/10 ratio of two. Thus it can be seen that those formulations which result in a 50/10 ratio which approaches the value of one and remain below two are preferred embodiments of the present invention. Additionally, the formulations which contain the X-8136 trimer catalyst are preferred as indicated above.

The free-rise density of the formulations is measured using a sample that is handmixed, then poured into a cup and permitted to rise unhindered, taking into consideration the volume and weight of the cup. The free-rise density measurement is well known to those skilled in the art.

TABLE 1

| CATALYSTS FOR ISOCYANATE TRIMERIZATION | | | | | |
|---|---|---|---|---|---|
| Oxides | Hydrides | Alkoxides | Hydroxides | Amines | Carboxylates |
| $Li_2O$ | $NaBH_4$ | $NaOCH_3$ | of Quaternary | $N(C_2H_5)_3$ | $HCO_2^- Na^+$ |
| $(Bu_3Sn)_2O$ | $R_3PbH$ | KOtBu | N | $N(CH_3)_2CH_2C_4H_3$ | $CO_3^= (Na^+)_2$ |
| $R_3AsO$ | | Borates | P | $N_2C_6H_{12}$ | $PhCO_2^- Na^+ / DMF$ |
| | | | As | | $CH_3CO_2^- K^+$ |
| | | | Sb | | $(CH_3CO_2^-)_2 Ca^{+2}$ |
| | | | | | Alkali soaps |
| | | | | | Naphthenates |
| | | | | | Pb oleate, salts |
| | | | | | Xanthates |

TABLE 2

| CATALYSTS FOR ISOCYANATE TRIMERIZATION | | |
|---|---|---|
| Acids | Combinations | Organometallics |
| HCl | Amines/epoxides | $R_3Si-SR'$ |
| $(CO_2H)_2$ | Amines/alcohols | $R_3Sn-SR'$ |
| $AlCl_3$ and | Amines/alkylene carbonates | $R_3Sn-S-SnR_3$ |
| Friedel-Crafts | Amines/alkylene imides | $R_3Sn-OR'$ |
| catalysts | Amines/carboxylic acids | $R_3Pb-NR'_2$ |
| | Amines/peroxides | $R_3Sb-(OR')_2$ |
| | Ammonium hydroxides/carbamates | $R_3Sb-(OCOR')_2$ |
| | Tetraethylammonium iodide/phenyl glycidyl ether | $RZn-OR'$ |
| | | $RZn-NR'_2$ |

|  | CHEMICAL/FORMULATION | | | | | | | |
|---|---|---|---|---|---|---|---|---|
|  | 1 | 2 | 3 | 4 | 5 | 6 | 7 | 8 |
| B(polyol)side | | | | | | | | |
| Thanol 575 | 20.00 | 20.00 | 20.00 | 20.00 | 20.00 | 20.00 | 20.00 | 20.00 |
| Pluracol 973 | 35.00 | 35.00 | 35.00 | 35.00 | 35.00 | 35.00 | 35.00 | 35.00 |
| Pluracol 994 | 40.00 | 40.00 | 40.00 | 40.00 | 40.00 | 40.00 | 40.00 | 40.00 |
| K-15 | 2.00 | 2.00 | 2.00 | 2.00 | 2.00 | 2.00 | 2.00 | 2.00 |
| TMR-2 | 0.00 | 2.00 | 3.00 | 2.00 | 2.00 | 2.00 | 2.30 | 2.10 |
| X-8136 | | | | | | | | |
| DABCO 33-LV | 2.00 | 2.00 | 2.00 | 1.00 | 1.00 | 1.00 | 1.00 | 1.01 |
| DC-5244 | 0.60 | 0.60 | 0.60 | 0.60 | 0.60 | 0.60 | 0.60 | 0.60 |
| WATER | 5.00 | 5.00 | 5.00 | 5.00 | 6.00 | 5.00 | 5.00 | 5.00 |
| POLYCAT 5 | | | | | | | | |
| B-8863-T | | | | | | | | |
| ISOCYANATE INDEX | | | | | | | | |
| PI-A | 200.00 | 200.00 | 250.00 | 200.00 | 200.00 | 200.00 | 300.00 | 250.00 |
| PI-B | | | | | | | | |
| FREE RISE DEN. | 2.16 | 2.10 | 2.43 | 2.14 |  | 2.29 | 3.30 | 2.62 |
| COMPRESSION STRENGTH | | | | | | | | |
| 10% | 138.30 | 129.40 | 128.20 | 107.30 | 92.10 | 105.80 | 170.80 | 128.30 |
| 50% | 208.40 | 219.40 | 194.00 | 177.40 | 153.90 | 182.70 | 248.30 | 198.10 |
| 70% | 301.10 | 295.80 | 278.00 | 244.20 | 225.00 | 259.60 | 336.90 | 274.70 |
| RATIO 50/10 (kpa) | 1.51 | 1.69 | 1.52 | 1.65 | 1.67 | 1.72 | 1.55 | 1.54 |

|  | CHEMICAL/FORMULATION | | | | | | | |
|---|---|---|---|---|---|---|---|---|
|  | 9 | 10 | 11 | 12 | 13 | 14 | 15 | 16 |
| B(polyol)side | | | | | | | | |
| Thanol 575 | 20.00 | 20.00 | 20.00 | 30.00 | 40.00 | 40.00 | 20.00 | 20.00 |
| Pluracol 973 | 35.00 | 35.00 | 35.00 | 35.00 | 35.00 | 35.00 | 35.00 | 35.00 |
| Pluracol 994 | 40.00 | 40.00 | 40.00 | 40.00 | 40.00 | 40.00 | 40.00 | 40.00 |
| K-15 | 3.00 | 2.00 | 2.00 | 2.00 | 2.00 | 2.00 | 2.00 | 2.00 |
| TMR-2 | 3.00 | 3.00 | 2.00 | 2.00 | 2.00 | 2.00 | 3.00 | 3.00 |
| X-8136 | | | | | | | | |
| DABCO 33-LV | 1.00 | 1.00 | 1.00 | 1.00 | 1.00 | 1.00 | 3.00 | 3.00 |
| DC-5244 | 0.60 | 0.60 | 0.60 | 0.60 | 0.60 | 0.60 | 0.60 | 0.60 |
| WATER | 5.00 | 7.50 | 5.00 | 5.00 | 5.00 | 6.00 | 5.00 | 5.00 |
| POLYCAT 5 |  | 0.80 | 0.50 | 0.50 | 0.50 | 0.50 | | |
| B-8863-T | | | | | | | | |
| ISOCYANATE INDEX | | | | | | | | |
| PI-A | 300.00 | 300.00 | 200.00 | 200.00 | 200.00 | 200.00 | | |
| PI-B | | | | | | | 250.00 | 300.00 |
| FREE RISE DEN. | 2.57 | 2.30 | 1.98 | 2.37 | 2.76 | 2.45 | 2.45 | 2.92 |
| COMPRESSION STRENGTH | | | | | | | | |
| 10% | 128.70 | 144.40 | 157.00 | 155.83 | 161.1 | 74.46 | 161.89 | 150.31 |
| 50% | 173.50 | 170.90 | 194.70 | 201.56 | 197.4 | 92.16 | 197.31 | 171.23 |
| 70% | 261.00 | 240.50 | 279.60 | 285.00 | 318.10 | 183.98 | 266.70 | 258.10 |
| RATIO 50/10 (kpa) | 1.35 | 1.18 | 1.24 | 1.29 | 1.22 | 1.23 | 1.22 | 1.14 |

|  | CHEMICAL/FORMULATION | | | | | | |
|---|---|---|---|---|---|---|---|
|  | 17 | 18 | 19 | 20 | 21 | 22 | 23 |
| B(polyol)side | | | | | | | |
| Thanol 575 | 20.00 | 20.00 | 20.00 | 20.00 | 20.00 | 20.00 | 20.00 |
| Pluracol 973 | 35.00 | 35.00 | 35.00 | 35.00 | 75.00 | | |
| Pluracol 994 | 40.00 | 40.00 | 40.00 | 40.00 | | 75.00 | |
| K-15 | 2.00 | 2.00 | 2.00 | 3.00 | 3.00 | 3.00 | 3.00 |
| TMR-2 | 3.00 | 3.00 | 3.00 | | | | |
| X-8136 | | | | 3.00 | | | |
| DABCO 33-LV | 3.00 | 3.00 | 1.00 | 1.00 | | | |
| DC-5244 | 0.60 | 0.60 | 0.60 | 0.60 | | | |
| WATER | 6.00 | 7.00 | 7.50 | 7.50 | | | |
| POLYCAT 5 | | | 0.80 | 0.80 | | | |
| POLYOL C | | | | | | | 75.00 |
| ISOCYANATE INDEX | | | | | | | |
| PI-A | | | | 200.00 | 200.00 | 200.00 | 200.00 |
| PI-B | 250.00 | 250.00 | 300.00 | | | | |
| FREE RISE DEN. | 2.86 | 2.90 | 2.35 | 1.80 | | | |
| COMPRESSION STRENGTH | | | | | | | |
| 10% | 118.40 | 146.40 | 125.00 | 128.00 | 120.00 | 112.00 | 115.00 |
| 50% | 145.00 | 168.10 | 189.00 | 168.00 | 167.00 | 127.00 | 171.00 |
| 70% | 230.00 | 242.00 | 292.00 | 190.00 | 257.00 | 178.00 | 266.00 |
| RATIO 50/10 (kpa) | 1.22 | 1.15 | 1.51 | 1.30 | 1.39 | 1.13 | 1.49 |

We claim:

1. A RIM molded energy absorbing polyurethane rigid foam including isocyanurate linkages for increasing the brittleness of the foam, the foam comprising the reaction product of:

(a) a graft polymer polyol which comprises an ethylene oxide-propylene oxide adduct of propylene glycol containing ethylene oxide as a cap with a member selected from the group consisting of styrene, acrylonitrile or combinations thereof dispersion;
(b) a crosslinking agent;
(c) an organic polyisocyanate;
(d) a urethane catalyst;
(e) surfactants;
(f) a blowing agent comprising water; and characterized by including
(g) a trimer catalyst for reacting with the organic polyisocyanate to form the isocyanurate linkages within the foam.

2. The foam of claim 1 wherein the isocyanate index is about 200 or greater.

3. The foam of claim 1 wherein the isocyanate index is from about 200 to about 350.

4. The foam of claim 3 wherein the dispersions comprises 15 to 45 percent of the graft polymer polyol.

5. The foam of claim 3 having a compression strength ratio between 50% deflection and 10% deflection of between 1 and 2.

6. The foam of claim 1 wherein the water comprises from around 5.0 to 7.5 weight percent of the total reactants.

7. The foam of claim 1 wherein the organic polyisocyanate has a functionality of around 2.2.

8. The foam of claim 1 wherein the organic polyisocyanate has a functionality of greater than 3.

* * * * *